United States Patent
Okamura et al.

(10) Patent No.: US 12,071,024 B2
(45) Date of Patent: Aug. 27, 2024

(54) DRIVING FORCE ADJUSTING DEVICE AND METHOD FOR DESIGNING DRIVING FORCE ADJUSTING DEVICE

(71) Applicant: MITSUBISHI JIDOSHA KOGYO KABUSHIKI KAISHA, Tokyo (JP)

(72) Inventors: Yutaro Okamura, Tokyo (JP); Ryota Takahashi, Tokyo (JP); Naoki Takahashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/274,350

(22) PCT Filed: Sep. 27, 2021

(86) PCT No.: PCT/JP2021/035320
§ 371 (c)(1),
(2) Date: Jul. 26, 2023

(87) PCT Pub. No.: WO2022/208938
PCT Pub. Date: Oct. 6, 2022

(65) Prior Publication Data
US 2024/0100961 A1 Mar. 28, 2024

(30) Foreign Application Priority Data
Mar. 30, 2021 (JP) .................................. 2021-056369

(51) Int. Cl.
| | |
|---|---|
| *B60K 1/02* | (2006.01) |
| *B60L 15/20* | (2006.01) |
| *F16H 48/36* | (2012.01) |

(52) U.S. Cl.
CPC ................ *B60L 15/20* (2013.01); *B60K 1/02* (2013.01); *F16H 48/36* (2013.01);
(Continued)

(58) Field of Classification Search
CPC .. B60L 15/20; B60L 2240/22; B60L 2240/42; B60K 1/02; B60K 1/00;
(Continued)

(56) References Cited

U.S. PATENT DOCUMENTS

| | | | |
|---|---|---|---|
| 7,110,867 B2 * | 9/2006 | Imazu .................... | B60K 6/365 |
| | | | 475/5 |
| 7,174,978 B2 * | 2/2007 | Taniguchi ............... | B60L 50/16 |
| | | | 903/905 |

(Continued)

FOREIGN PATENT DOCUMENTS

| | | | |
|---|---|---|---|
| CN | 109466299 A | * 3/2019 | ............... B60K 1/02 |
| JP | H03284420 A | * 12/1991 | |

(Continued)

OTHER PUBLICATIONS

International Search Report, issued in PCT/JP2021/035320, PCT/ISA/210, dated Dec. 7, 2021.

(Continued)

*Primary Examiner* — Sherry L Estremsky
(74) *Attorney, Agent, or Firm* — Birch, Stewart, Kolasch & Birch, LLP (57) ABSTRACT

This disclosure relates to a driving force adjusting device including a pair of electric motors (1) that drives left and right wheels (5) of a vehicle, a differential mechanism (3) that provides the left and right wheels (5) with a torque difference, and left and right drive shafts (4) that transmits driving force from the differential mechanism and to the left and right wheels (5), the driving force adjusting device having four elements and two degree of freedom. In this driving force adjusting device, inertia moments ($J_{ML}, J_{MR}$) on paths from the pair of electric motors (1) to the left and right wheels (5) are set to values such that a resonance frequency (f) of the driving force adjusting device when the vehicle is (Continued)

turning comes to be larger than a yaw resonance frequency ($f_{yaw}$) of the vehicle.

5 Claims, 8 Drawing Sheets

(52) U.S. Cl.
CPC ....... *B60L 2240/22* (2013.01); *B60L 2240/42* (2013.01); *F16H 2048/364* (2013.01)

(58) Field of Classification Search
CPC ............... F16H 48/36; F16H 2048/364; F16H 2057/0012; B60B 2900/131; B60B 2900/1214; B60B 2900/311
See application file for complete search history.

(56) References Cited

U.S. PATENT DOCUMENTS

| | | | | |
|---|---|---|---|---|
| 7,938,222 | B2* | 5/2011 | Mikels | B60B 35/12 180/905 |
| 11,085,516 | B2* | 8/2021 | Chen | F16H 57/037 |
| 2022/0048375 | A1 | 2/2022 | Takahashi et al. | |
| 2022/0196130 | A1* | 6/2022 | Chiba | F16H 57/0457 |

FOREIGN PATENT DOCUMENTS

| | | | | |
|---|---|---|---|---|
| JP | 2004147491 A | * | 5/2004 | ............ B60K 6/365 |
| JP | 2010264940 A | * | 11/2010 | |
| JP | 2020-40416 A | | 3/2020 | |
| WO | WO 2020179202 A1 | | 9/2020 | |
| WO | WO-2024038710 A1 | * | 2/2024 | |

OTHER PUBLICATIONS

Written Opinion of the International Searching Authority, issued in PCT/JP2021/035320, PCT/ISA/237, dated Dec. 7, 2021.
International Preliminary Report on Patentability and English translation of the Written Opinion of the International Searching Authority dated Oct. 3, 2023 for Application No. PCT/2021/035320.
Extended European Search Report dated Jun. 13, 2024 for Application No. EP 21935096.4.

\* cited by examiner

DRIVING FORCE ADJUSTING DEVICE AND METHOD FOR DESIGNING DRIVING FORCE ADJUSTING DEVICE

TECHNICAL FIELD

The present invention relates to a four-element two-degree-of-freedom driving force adjusting device that drives left and right wheels of a vehicle with a pair of electric motors and a differential mechanism, and a method of designing the driving force adjusting device.

BACKGROUND TECHNIQUE

Conventionally, a technique has been known which avoids amplification of vehicle body vibration due to resonance by optimizing a resonance frequency of a driving force adjusting device that drives the drive wheels of a vehicle. For example, there is a technique that reduces an uncomfortable feeling that would be given to a user by setting a resonance frequency of a torsional oscillation system to a frequency corresponding to a lower limit of a normal range of an engine speed or less (see Patent Document 1).

PRIOR ART REFERENCE

Patent Document

[Patent Document 1] Japanese Laid-open Patent Publication No. 2020-040416

SUMMARY OF INVENTION

Problem to be Solved by Invention

On the other hand, in a driving force adjusting device of four elements and two degree of freedom which device interposes a differential mechanism between the left and right wheels and also between a pair of electric motors, the resonance frequency of the driving force adjusting device varies with a turning state of the vehicle. Consequently, such a device has a problem that is incapable of effectively suppressing amplification of vehicle body vibration due to resonance and has a difficulty in improving the riding comfortability of the vehicle.

With the foregoing problems in view, one of the objects of the present invention is to provide a four-element two-degree-of-freedom driving force adjusting device aiming at improving a riding comfortability and a method for designing the driving force adjusting. In addition to this object, influences and effects which are derived from each configuration of an embodiment to carry out the invention to be described below and which conventional technique does not attain can be regarded as other objects of the present disclosure.

Means to Solve Problem

The disclosed driving force adjusting device includes a pair of electric motors that drives left and right wheels of a vehicle, a differential mechanism that provides the left and right wheels with a torque difference, and left and right drive shafts that transmit driving force from the differential mechanism to the left and right wheels, the driving force adjusting device having four elements and two degree of freedom. In this device, the inertia moments on paths from the pair of electric motors to the left and right wheels are set to values such that a resonance frequency of the driving force adjusting device when the vehicle is turning comes to be larger than a yaw resonance frequency of the vehicle.

Effect of Invention

According to the driving force adjusting device and the method for the driving force adjusting device disclosed herein, the riding comfortability of the vehicle can be improved.

EMBODIMENT TO CARRY OUT INVENTION

1. Device Structure

Figure 1:
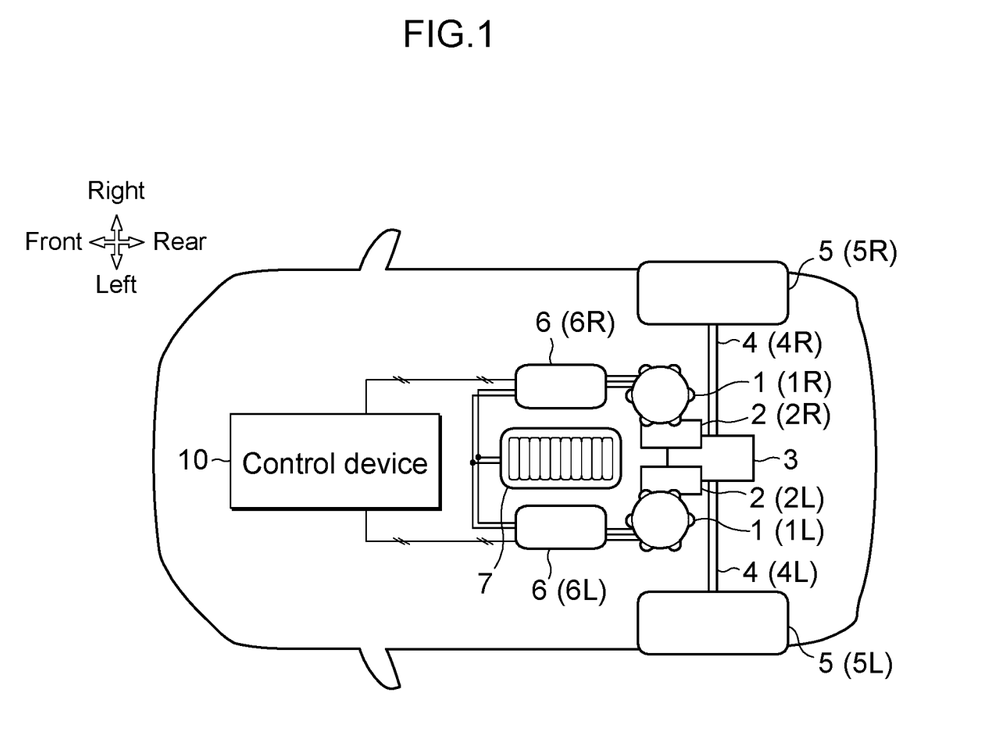
FIG. 1 is a block diagram showing a vehicle to which a driving force adjusting device according to an embodiment is applied.

With reference to FIGS. 1 to 11, description will now be made in relation to a driving force adjusting device according to an embodiment. A vehicle adopting the driving force adjusting device is provided with a pair of electric motors 1 that drive left and light wheels 5 (in this example, rear wheels), a differential mechanism 3 that provides the left and right wheels 5 with a torque difference, and drive shafts 4 (axles) that transmit driving force to the left and right wheels 5. In the present embodiment, a suffix sign (L,R) attached to a number sign represents the arrangement position of the element (on the left or right side of vehicle). For example, a reference sign 5R represents one (i.e., right wheel) of the left and right wheels 5 positioned on the right side (Right)

of the vehicle, and a reference sign 5L represents the other (i.e., left wheel) positioned on the left side (Left) of the vehicle.

The pair of electric motors 1 have a function of driving at least either of a front wheel and a rear wheel of the vehicle, and can have a function of driving all four wheels. Between the pair of electric motors 1, one positioned on the right side is also referred to as a right electric motor 1R (right motor) and the other positioned on the left side is also referred to as a left electric motor 1L (left motor). The right electric motor 1R and the left electric motor 1L operate independently of each other, and can individually output the driving forces having different magnitudes from each other. These electric motors 1 are each coupled to the differential mechanism 3 via one of a pair of reduction mechanisms 2, which are separately provided from each other. The right electric motor 1R and the left electric motor 1L of the present embodiment have the same rated outputs.

Each reduction mechanism 2 is a mechanism that increases the torque by reducing the driving force output from the corresponding electric motor 1. The reduction ratio G of the reduction mechanism 2 is appropriately set according to the output characteristic and the performance of the electric motor 1. Between the pair of reduction mechanisms 2, one positioned on the right side is also referred to as a right reduction mechanism 2R, and the other positioned on the left side is also referred to as a left reduction mechanism 2L. The right reduction mechanism 2R and the left reduction mechanism 2L of the present embodiment have the same reduction ratio G. If the torque performances of the electric motors 1 are sufficiently high, the reduction mechanisms 2 may be omitted.

The differential mechanism 3 is a mechanism having a yaw control function (Active Yaw Control function so-called AYC). The differential mechanism 3 is interposed between a drive shaft 4 (right axle (right wheel axle) 4R) connected to the right wheel 5R and a drive shaft 4 (left axle (left wheel axle) 4L) connected to the left wheel 5L. The yaw control function adjusts a yaw moment by actively controlling the sharing ratio of the driving forces (driving torques) of the left and right wheels 5, and stabilizes the posture of the vehicle. Inside the differential mechanism 3, gear trains such as a planetary gear mechanism and a differential gear mechanism are incorporated. The driving force transmitted from each of the pair of electric motors 1 is distributed to one of the left and right wheels 5 through these gear trains. A vehicle driving device including the pair of electric motor 1 and the differential mechanism 3 is also referred to as a DM-AYC (Dual-Motor Active Yaw Control) device.

Figure 2:
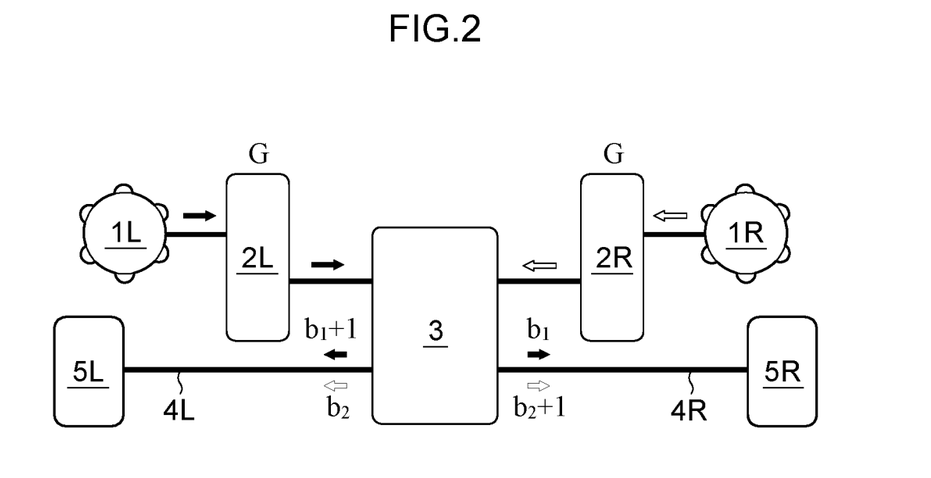
FIG. 2 is a schematic diagram showing a structure of the driving force adjusting device of the vehicle of FIG. 1.

FIG. 2 is a schematic diagram illustrating a configuration of the reduction mechanisms 2 and the differential mechanism 3. The reduction ratio G of each reduction mechanism 2 can be expressed as a ratio of the rotational angular speed transmitted from the corresponding motor 1 to the reduction mechanism 2 and the rotational angular speed transmitted from the reduction mechanism 2 to the differential mechanism 3 (or a ratio of the number of teeth of the gears). Here, in relation to an inner structure of the differential mechanism 3, expressing a gear ratio of a path that transmits the driving force of the left electric motor 1L to the right wheel 5R by $b_1$, expressing a gear ratio of a path that transmits the driving force of the right electric motor 1R to the left wheel 5L by $b_2$, expressing rotational angular speeds of the left and right electric motors 1 respectively by motor angular speeds $\omega_{Lm}$, and $\omega_{Rm}$, expressing the rotational angular speeds of the left and right wheels 5 respectively by wheel speeds $\omega_{Lw}$ and $\omega_{Rw}$. The following Expressions 1 and 2 are established in the present embodiment.

[Math 1]

$$\omega_{Lw} = \frac{\left\{\frac{b_1}{b_1+b_2+1}(\omega_{Rm}-\omega_{Lm})+\omega_{Lm}\right\}}{G} \quad \text{Expression 1}$$

$$\omega_{Rw} = \frac{\left\{\frac{b_1+1}{b_1+b_2+1}(\omega_{Rm}-\omega_{Lm})+\omega_{Lm}\right\}}{G} \quad \text{Expression 2}$$

$\omega_{Lw}$: angular speed of left wheel, $\omega_{Rw}$: angular speed of right wheel,
$\omega_{Lm}$: angular speed of left motor, $\omega_{Rm}$: angular speed of right motor,
$b_1$: gear ratio of right wheel side in differential mechanism,
$b_2$: gear ratio of left wheel side in differential mechanism,
G: reduction ratio The electric motors 1 are electrically connected to the battery 7 via the inverters 6. The inverters 6 are inverting devices (DC-AC invertors) that mutually convert the electric power (Direct-Current power) of the DC circuit of the battery 7 side and the electric power (Alternating-Current power) of the AC circuit of the electric motor 1 side. The battery 7 is, for example, a lithium-ion battery or a nickel-metal hydride battery, and is a secondary battery capable of supplying a high-voltage DC current of several hundred volts. While the motors 1 are power running 1, the DC power is converted into AC power by the inverters 6 and the converted AC power is then supplied to the electric motors 1. While the electric motors 1 are generating, the generated power is converted into DC power by the inverters 6 and the battery 7 is charged with the converted DC power. The operating state of each inverter 6 is controlled by the control device 10.

Figure 3:
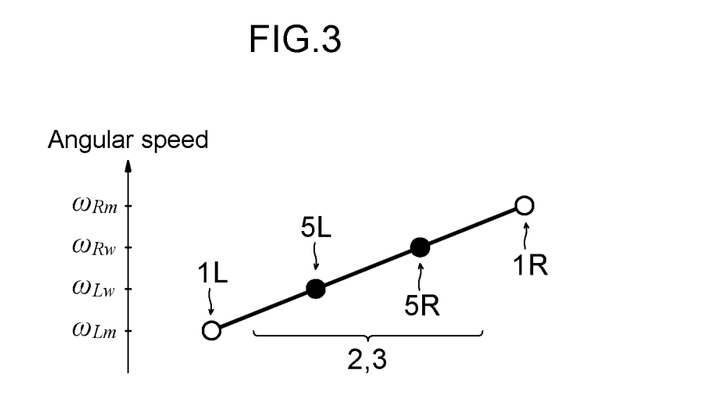
FIG. 3 is a collinear diagram showing a relationship between electric motors and angular speeds of left and right wheels of FIG. 1.

FIG. 3 is a collinear diagram showing the relationship among respective angular speeds of the left electric motor 1L, and the right electric motor 1R, the left wheel 5L, and the right wheel 5R. In this collinear diagram, the wheel speeds $\omega_{Lw}$ and $\omega_{Rw}$ (i.e., angular speeds) of the left wheel 5L and the right wheel 5R are located on a straight line connecting motor angular speeds $\omega_{Lm}$ and $\omega_{Rm}$ of the left electric motor 1L and the right electric motor 1R to each other. The wheel speeds $\omega_{Lw}$, and $\omega_{Rw}$ vary according to the motor angular speeds $\omega_{Lm}$ and $\omega_{Rm}$. Thus, the driving force adjusting device including the pair of electric motors 1, the differential mechanism 3, and the drive shafts 4 is a four-element two-degree-of-freedom drive force adjusting device.

The control device 10 is one of electronic control unit (ECU, Electronic Control Unit) installed in the vehicle. The control device 10 is a computer that controls the outputs of the electric motors 1 by managing the operating statuses of the inverters 6. Inside the control unit 10, a processor (central processing unit), a memory (main memory), a storage device (storage), an interface device, and the like, which do not appear in the drawings, are included. These elements are communicably coupled to each other via an internal bus.

An example of the processor is a microprocessor, such as a CPU (Central Processing Unit) and an MPU (Micro Processing Unit), and examples of the memory are a ROM (Read Only Memory), a RAM (Random Access Memory), and a non-volatile memory. The contents of the control performed by the control device 10 are recorded and stored as firmware or an application program in the memory, and when the program is to be executed, the contents of the program are expanded in a memory space and executed by the processor.

In the four-element two-degree-of-freedom driving force adjusting device, the inertia moment upstream from the drive shaft 4 increases during the vehicle is turning, and the resonance frequency f of the driving force adjusting device decreases. When the resonance frequency f matches the yaw resonance frequency $f_{yaw}$ of the vehicle, the yaw rate vibration of the vehicle body is amplified and the riding comfortability of the vehicle is lowered. As a solution to the above, in this embodiment, the resonance frequency f of the driving force adjusting device is previously set to be larger than the yaw resonance frequency $f_{yaw}$ of the vehicle.

The expression for calculating a resonance frequency f of the driving force adjusting device is given by the following Expressions 3 and 4 Expression 3 represents the resonance frequency $f_L$ of the left axle 4L, and Expression 4 represents the resonance frequency $f_R$ of the right axle 4R. A stiffness $K_d$ of the drive shafts 4 and downstream inertia moment $J_w$ (inertia moments of the left and right wheels 5) are given in constant numbers, for example

[Math 2]

$$f_L = \frac{1}{2\pi}\sqrt{\frac{K_d}{J_w}\left(1 + \frac{J_w}{J_{ML}}\right)} \quad \text{Expression 3}$$

$$f_R = \frac{1}{2\pi}\sqrt{\frac{K_d}{J_w}\left(1 + \frac{J_w}{J_{MR}}\right)} \quad \text{Expression 4}$$

$f_L$: resonance frequency of left axle, $f_R$: resonance frequency of right axle, $K_d$: stiffness of drive shaft, $J_w$: downstream inertia moment, $J_{ML}$: upstream inertia moment of left path, $J_{MR}$: upstream inertia moment of right path In order to increase the resonance frequencies $f_L$ and $f_R$ shown in Expressions 3 and 4, it is conceivable to increase the stiffness $K_d$ of the drive shafts 4 or to reduce the downstream inertia moment $J_w$. In other words, the stiffness $K_d$ of the drive shafts 4 and the downstream inertia moment $J_w$ may be adjusted such that the resonance frequencies $f_L$ and $f_R$ on the left wheel side and the right wheel side each come to be larger than the yaw resonance frequency $f_{yaw}$ of the vehicle. By using these methods in combination, the values of the resonance frequencies $f_L$ and $f_R$ further move away from yaw resonance frequency $f_{yaw}$ of the vehicle, and the resonance at the time of turning is less likely to occur.

Further, an upstream inertia moment is given by the following Expressions 5 and 6, for example. Expression 5 represents an upstream inertia moment $J_{ML}$ on left path (inertia moment of the power transmission path from the left electric motor 1L to the left wheel 5L). Expression 6 represents an upstream inertia moment $J_{MR}$ on the right path (inertia moment of the power transmission path from the right electric motor 1R to the right wheel 5R). The magnitude of the upstream inertia moments $J_{ML}$ and $J_{MR}$ vary according to the ratios of the temporal differentiation values of the wheel speeds $\omega_{Lw}$ and $\omega_{Rw}$.

[Math 3]

$$J_{ML} = G^2 I_m + G^2 I_m \left\{ b_1^2 + b_2^2 + 2b_1 - (b_1^2 + b_2^2 + b_1 + b_2)\frac{\dot\omega_{Rw}}{\dot\omega_{Lw}} \right\} \quad \text{Expression 5}$$

$$J_{MR} = G^2 I_m + G^2 I_m \left\{ b_1^2 + b_2^2 + 2b_2 - (b_1^2 + b_2^2 + b_1 + b_2)\frac{\dot\omega_{Lw}}{\dot\omega_{Rw}} \right\} \quad \text{Expression 6}$$

$J_{ML}$: upstream inertia moment of left path, $J_{MR}$: upstream inertia moment of right path, G: reduction ratio of reduction mechanism, $I_m$: motor inertia moment, $\omega_{Lm}$: angular speed of left motor, $\omega_{Rm}$: angular speed of right motor, $b_1$: gear ratio of right wheel side in differential mechanism, $b_2$: gear ratio of left wheel side in differential mechanism, $\dot\omega_{Lw}$: angular acceleration of left wheel (temporal differentiation of angular speed of left wheel), $\dot\omega_{Rw}$: angular acceleration of right wheel (temporal differentiation of angular speed of right wheel)

Figure 11:
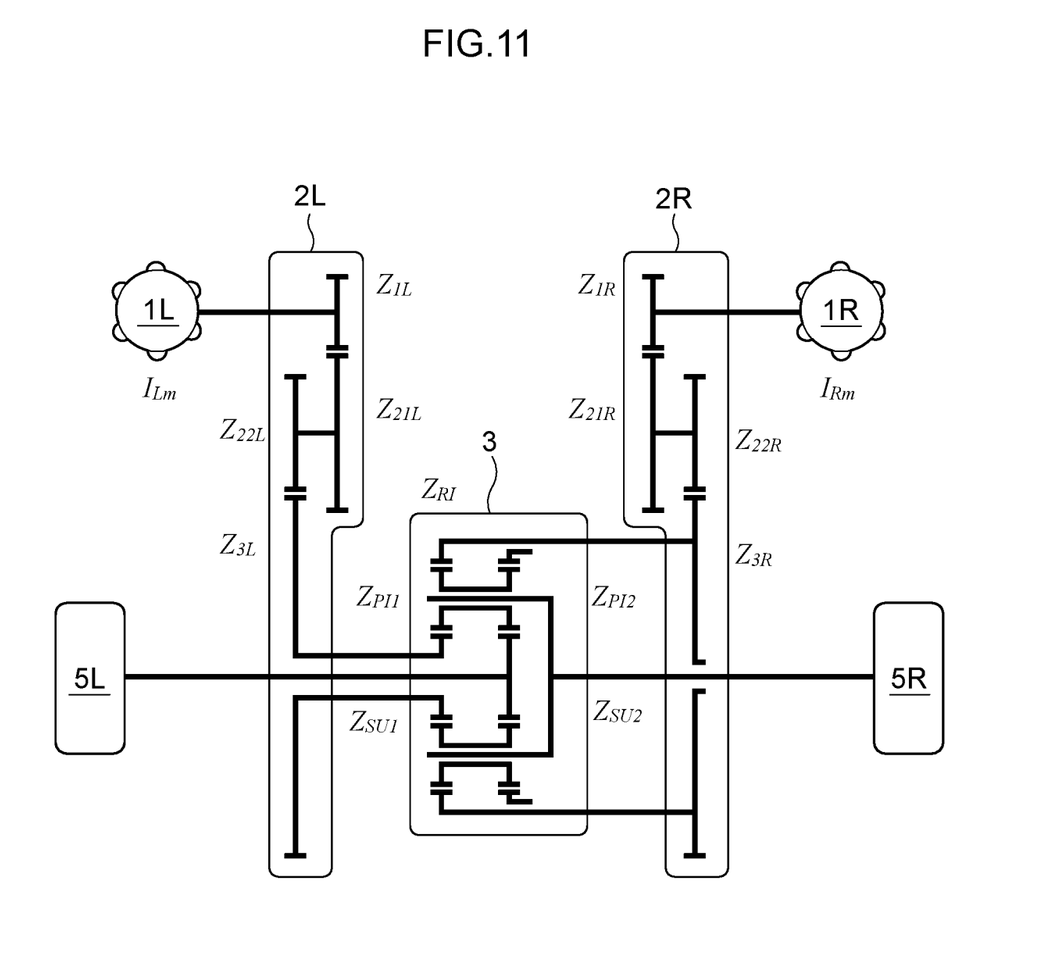
FIG. 11 is a schematic diagram showing a structure that applies a planetary gear mechanism in the driving force adjusting device of FIG. 2.

If the inertia moments of the various gears included in the reduction mechanisms 2 and the differential mechanism 3 are further considered, the upstream inertia moments may be given by Expressions different from Expression 5 and 6. For example, assuming that a driving force adjusting device is provided with the differential mechanism 3 including the planetary gear mechanism as shown in FIG. 11, the upstream inertia moments can be expressed by the following Expressions 5' and 6'.

[Math 4]

$$J_{ML} = \qquad\qquad \text{Expression 5'}$$

$$\left[ (b_1+1)^2 \cdot \left\{ \left((I_{Lm}+I_{1L})\left(\frac{Z_{21L}}{Z_{1L}}\right)^2 + I_{21L} + I_{22L}\right)\left(\frac{Z_{3L}}{Z_{22L}}\right)^2 + I_{SU1} \right\} + \right.$$

$$b_2^2 \cdot \left\{ \left((I_{Rm}+I_{1R})\left(\frac{Z_{21R}}{Z_{1R}}\right)^2 + I_{21R} + I_{22R}\right)\left(\frac{Z_{3R}}{Z_{22R}}\right)^2 + I_{RI} \right\} +$$

$$\left. I_{SU1} + 4I_{PI}\frac{Z_{SU2}}{Z_{P2}} \cdot \frac{2\frac{Z_{SU1}}{Z_{R1}}(b_1+1)}{1 - \frac{Z_{SU1}}{Z_{R1}}} \right] -$$

$$\left[ b_1(b_1+1) \cdot \left\{ \left((I_{Lm}+I_{1L})\left(\frac{Z_{21L}}{Z_{1L}}\right)^2 + I_{21L} + I_{22L}\right)\left(\frac{Z_{3L}}{Z_{22L}}\right)^2 + I_{SU1} \right\} + \right.$$

$$b_2(b_2+1) \cdot \left\{ \left((I_{Rm}+I_{1R})\left(\frac{Z_{21R}}{Z_{1R}}\right)^2 + I_{21R} + I_{22R}\right)\left(\frac{Z_{3R}}{Z_{22R}}\right)^2 + I_{RI} \right\} +$$

$$\left. 4I_{PI}\frac{Z_{SU2}}{Z_{P2}} \cdot \frac{1 + (1+2b_1)\frac{Z_{SU1}}{Z_{R1}}}{1 - \frac{Z_{SU1}}{Z_{R1}}} \right] \cdot \frac{\dot\omega_{Rds}}{\dot\omega_{Lds}}$$

$$J_{MR} = \qquad\qquad \text{Expression 6'}$$

$$\left[ (b_2+1)^2 \cdot \left\{ \left((I_{Rm}+I_{1R})\left(\frac{Z_{21R}}{Z_{1R}}\right)^2 + I_{21R} + I_{22R}\right)\left(\frac{Z_{3R}}{Z_{22R}}\right)^2 + I_{RI} \right\} + b_1^2 \cdot \right.$$

$$\left\{ \left((I_{LM}+I_{1L})\left(\frac{Z_{21L}}{Z_{1L}}\right)^2 + I_{21L} + I_{22L}\right)\left(\frac{Z_{3L}}{Z_{22L}}\right)^2 + I_{SU1} \right\} + I_{C4} + 4r_{C4}^2 M_{PI} \right] -$$

$$\left[ b_1(b_1+1) \cdot \left\{ \left((I_{Lm}+I_{1L})\left(\frac{Z_{21L}}{Z_{1L}}\right)^2 + I_{21L} + I_{22L}\right)\left(\frac{Z_{3L}}{Z_{22L}}\right)^2 + I_{SU1} \right\} + \right.$$

$$\left. b_2(b_2+1) \cdot \left\{ \left((I_{Rm}+I_{1R})\left(\frac{Z_{21R}}{Z_{1R}}\right)^2 + I_{21R} + I_{22R}\right)\left(\frac{Z_{3R}}{Z_{22R}}\right)^2 + I_{RI} \right\} \right] \cdot \frac{\dot\omega_{Lds}}{\dot\omega_{Rds}}$$

Figure 4A:
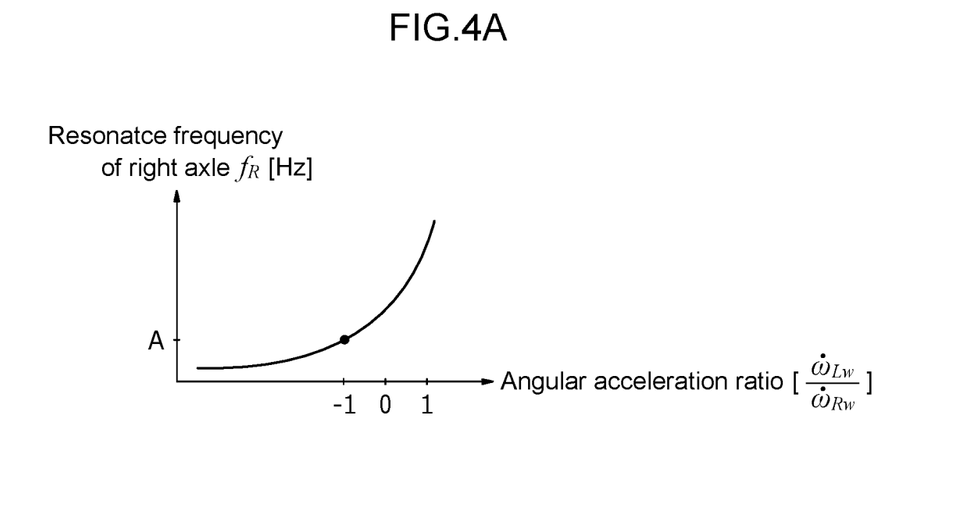
FIGS. 4(A) and 4(B) are diagrams showing relationships between the resonance frequency of the driving force adjusting device and an angular acceleration ratio of the left and right wheels.
Figure 4B:
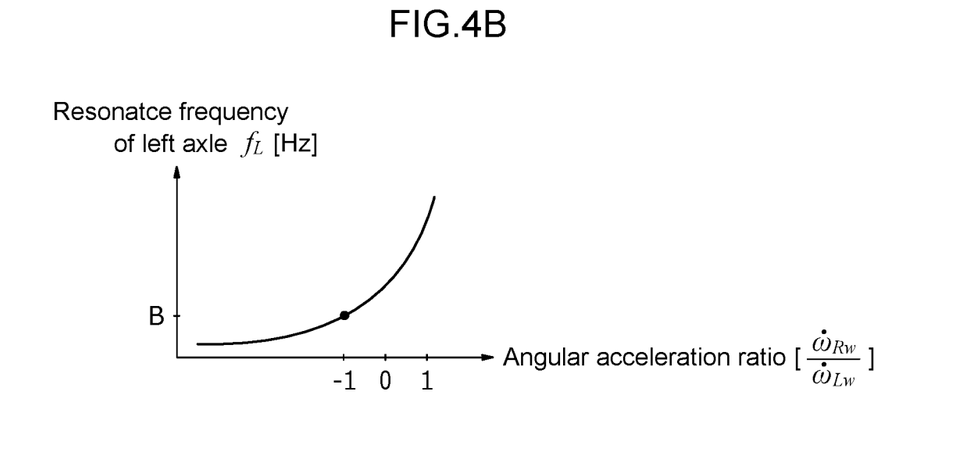

$J_{ML}$: upstream inertia moment of left path,
$J_{MR}$: upstream inertia moment of right path,
$b_1$: gear ratio of right wheel side in differential mechanism,
$b_2$: gear ratio of left wheel side in differential mechanism,
$\omega_{Lds}$: angular acceleration of left axle,
$\omega_{Rds}$: angular acceleration of right axle,
$I_{Lm}$: inertia moment of left motor, $I_{Rm}$: inertia moment of right motor,
$Z_{SU1}, Z_{SU2}$: number of teeth of sun gear,
$I_{SU1}, I_{SU2}$: inertia moment of sun gear,
$Z_{Rf}$: number of teeth of ring gear, $I_{Rf}$: inertia moment of ring gear,
$I_{CA}$: inertia moment of carrier,
$Z_{PI1}, Z_{PI2}$: number of teeth of pinion gear,
$I_{Pf}$: inertia moment of pinion gear,
$Z_{1L}$: number of teeth of reduction gear in left first axis,
$I_{1L}$: inertia moment of reduction gear in left first axis,
$Z_{21L}$: number of teeth of reduction gear in left second upstream axis,
$I_{21L}$: inertia moment of reduction gear in left second upstream axis,
$Z_{22L}$: number of teeth of reduction gear in left second downstream axis,
$I_{22L}$: inertia moment of reduction gear in left second downstream axis,
$Z_{1R}$: number of teeth of reduction gear in right first axis,
$I_{1R}$: inertia moment of reduction gear in right first axis,
$Z_{21R}$: number of teeth of reduction gear in right second upstream axis,
$I_{21R}$: inertia moment of reduction gear in right second upstream axis,
$Z_{22R}$: number of teeth of reduction gear in right second downstream axis,
$I_{22R}$: inertia moment of reduction gear in right second downstream axis,
$Z_{3L}$: number of teeth of reduction gear in left third axis,
$Z_{3R}$: number of teeth of reduction gear in right third axis,
$Y_{CA}$: distance between rotating center of right axis and center of pinion gear
$M_{Pf}$: mass of pinion gear FIG. 4(A) and FIG. 4(B) are diagrams each showing an example of a relationship between the resonance frequency f of the driving force adjusting device and the angular acceleration ratio of the left and right wheels 5. FIG. 4(A) illustrates a relationship between the resonance frequency $f_R$ of the right axle 4R and a ratio of the angular acceleration of the left wheel 5L to the angular acceleration of the right wheel 5R. FIG. 4(B) illustrates a relationship between the resonance frequency $f_L$ of the left axle 4L and a ratio of the angular acceleration of the right wheel 5R to the angular acceleration of the left wheel 5L. The resonance frequency f of the driving force adjusting device has a characteristic of increasing as the angular acceleration ratio increases and decreasing as the angular acceleration ratio decreases.

The inertia moment on the upstream side from the drive shaft 4 is set to be greater than the yaw resonance frequency $f_{yaw}$ of the vehicle when the angular acceleration in each of the left and right wheels 5 varies within a range of −1 to 1. In the example shown in FIG. 4(A), the minimum value of the resonance frequency $f_R$ when the angular acceleration varies within the range of −1 to 1 is A. The values of the upstream inertia moment $J_{ML}$ on left path and the upstream inertia moment $J_{MR}$ on right path are set such that A is larger than the yaw resonance frequency $f_{yaw}$ of the vehicle. The same applies to an example shown in FIG. 4(B), in which the upstream inertia moment $J_{ML}$ on left path and the upstream inertia moment $J_{MR}$ on right path are set such that the minimum value B of the resonance frequency $f_L$ is larger than yaw resonance frequency $f_{yaw}$ of the vehicle.

Figure 5:
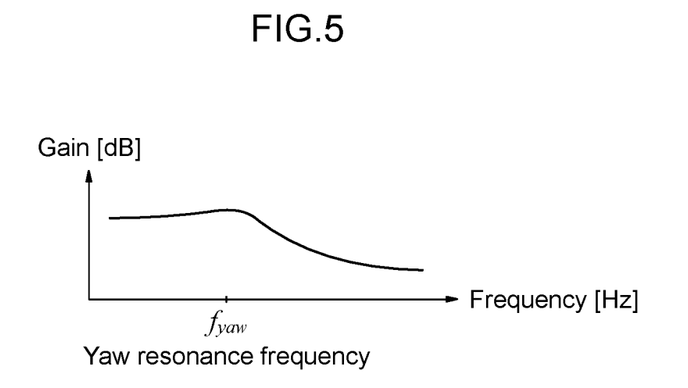
FIG. 5 is a Bode plot diagram (a graph showing a relationship between a gain and a frequency) to explain a yaw resonance frequency of the vehicle of FIG. 1.

The yaw resonance frequency $f_{yaw}$ of the vehicle can be ascertained from a graph (Bode plot diagram) generated on the basis of the following motion equation of the vehicle. The graph in FIG. 5 shows the relationship between the gain of the resonance (the ratio of the output amplitude to the input amplitude) and the frequency of the resonance. A frequency that gives the maximal gain becomes the yaw resonance frequency $f_{yaw}$. An ordinary yaw resonance frequency $f_{yaw}$ of the vehicle is usually in a range from 1.0 to 1.5 [Hz].

[Math 5]

Motion equation of vehicle $$\begin{cases} mV(\dot{\beta}+\gamma) = 2K_f \beta_f + 2K_r \beta_r \\ I\dot{\gamma} = 2K_f \beta_f l_f - 2K_r \beta_r l_r + M_Z \end{cases}$$

m: mass, V: vehicle speed, β: slip angle of vehicle body, γ: yaw rate
$K_f$: cornering power of front wheel, $K_r$: cornering power of rear wheel,
$\beta_f$: slip angle of front wheel, $\beta_r$: slip angle of rear wheel,
I: inertia moment around yaw axis,
$l_f$: distance between front axle and center of gravity,
$l_r$: distance between rear axle and center of gravity,
$M_Z$: input yaw moment (vibrational component)

Assuming that the ratio of the angular acceleration of the right wheel 5R to the angular acceleration of the left wheel 5L is −1 and the two gear ratios $b_1$ and $b_2$ are the same value b, the upstream inertia moments $J_{ML}$ and $J_{MR}$ shown in Expressions 5 and 6 are both expressed by the following Expression 7. Therefore, when slipping is not considered, parameters that affect the resonance frequencies $f_L$ and $f_R$ are following three types: the motor inertia moment $I_m$ of the electric motor 1; the torque difference amplification ratio α of the differential mechanism 3; and the reduction ratio G of the reduction mechanism 2.

[Math 6]

$$J_{ML}=J_{MR}=G^2I_m+G^2I_m\{4b^2+4b\}=G^2I_m(2b+1)^2=G^2I_m\alpha^2 \quad \text{Expression 7}$$

$J_{ML}$: upstream inertia moment of left path,
$J_{MR}$: upstream inertia moment of right path,
G: reduction ratio of reduction mechanism,
$I_m$: motor inertia moment, b: gear ratio in differential mechanism,
α: amplification ratio of torque difference (herein α=2b+1)

Figure 6:
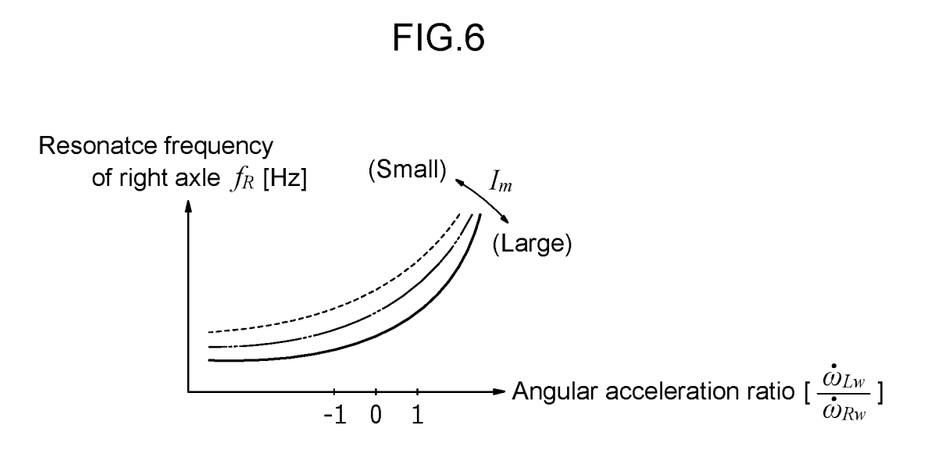
FIG. 6 is a graph showing an example of a relationship among a resonance frequency of the driving force adjusting device of FIG. 1, an angular acceleration ratio of the left and right wheels, and a motor inertia moment $I_m$.

FIG. 6 is a graph showing how the relationship between the resonance frequency $f_R$ of the right axle 4R and the ratio of the angular acceleration of the left wheel 5L to the angular acceleration of the right wheel 5R changes when the motor inertia moment $I_m$ varies. The resonance frequency $f_R$ increases as the motor inertia moment $I_m$ is smaller and decreases as the motor inertia moment $I_m$ is larger. The graph representing the relationship between the resonance frequency $f_R$ and the angular acceleration ratio moves more upward when the motor inertia moment $I_m$ is smaller. The minimum value of the resonance frequency $f_R$ when the angular acceleration varies within the range of −1 to 1 is the value when the angular acceleration ratio is −1. Therefore, it is sufficient that the value of the motor inertia moment $I_m$ is set such that the minimum value is larger than the yaw resonance frequency $f_{yaw}$ of the vehicle. For example, if the value of motor inertia moment $I_m$ at which the resonance frequency $f_R$ when the angular acceleration ratio is −1 matches the yaw resonance frequency $f_{yaw}$ of the vehicle is represented by $I_{mA}$, it is sufficient that the motor inertia moment $I_m$ is set to have a value less than $I_{mA}$.

Figure 7:
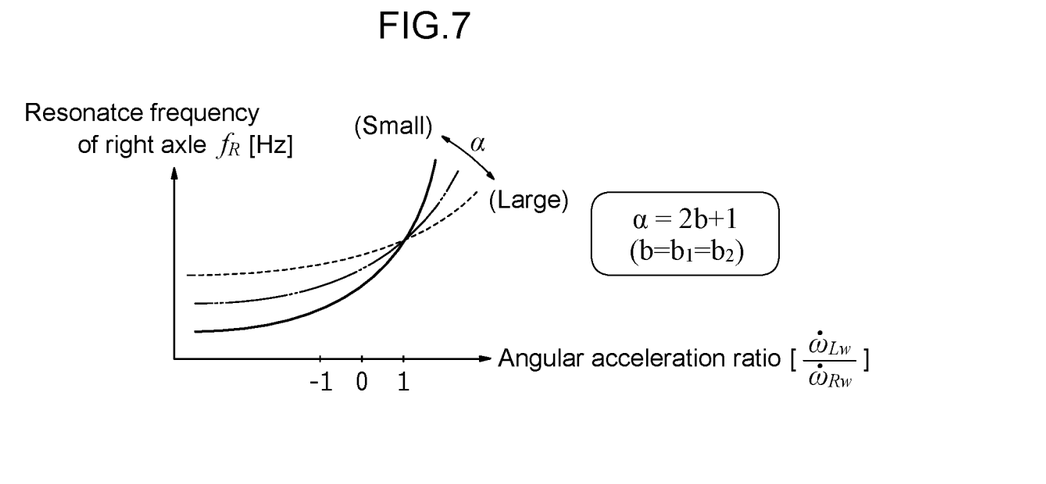
FIG. 7 is a graph showing a relationship among a resonance frequency of the driving force adjusting device of FIG. 1, an angular acceleration ratio of the left and right wheels, and a torque difference amplification rate $\alpha$.

FIG. 7 is a graph showing how the relationship between the resonance frequency $f_R$ of the right axle 4R and the ratio of the angular acceleration of the left wheel 5L to the angular acceleration of the right wheel 5R changes when the torque amplification ratio α varies. The inclination (gradient) of increasing of the resonance frequency $f_R$ becomes steeper (heavy slope) as the torque difference amplification ratio α is smaller, and becomes gentler (mild slope) as the torque difference amplification ratio α is larger. The minimum value of the resonance frequency $f_R$ when the angular acceleration varies within the range of −1 to 1 is the value when the angular acceleration ratio is −1. Therefore, it is sufficient that the value of the torque difference amplification ratio α is set such that the minimum value is larger than the yaw resonance frequency $f_{yaw}$ of the vehicle. For example, if the value of the torque difference amplification ratio α at which the resonance frequency $f_R$ when the angular acceleration ratio is −1 matches the yaw resonance frequency $f_{yaw}$ of the vehicle is represented by $\alpha_A$, it is sufficient that the value of the torque difference amplification ratio α is set to have a value less than $\alpha_A$.

Figure 8:
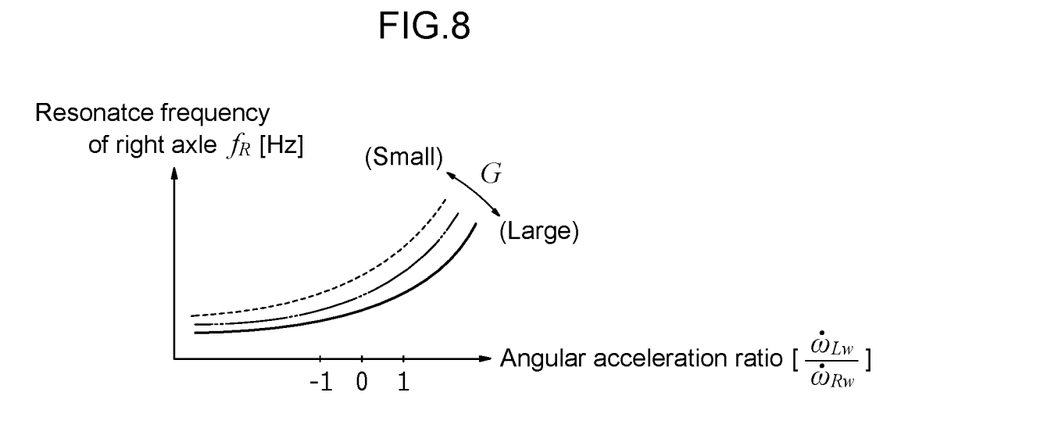
FIG. 8 is a graph showing a relationship among a resonance frequency of the driving force adjusting device of FIG. 1, an angular acceleration ratio of the left and right wheels, and a reduction ratio G of a reduction mechanism.

FIG. 8 is a graph showing how the relationship between the resonance frequency $f_R$ of the right axle 4R and the ratio of the angular acceleration of the left wheel 5L to the angular acceleration of the right wheel 5R changes when the reduction ratio G varies. The resonance frequency $f_R$ increases as the reduction ratio G is smaller, and decreases as the reduction ratio G is larger. The graph representing the relationship between the resonance frequency $f_R$ and the angular acceleration ratio moves more upward when the reduction ratio G is smaller. The minimum value of the resonance frequency $f_R$ when the angular acceleration varies within the range of −1 to 1 is the value when the angular acceleration ratio is −1. Therefore, it is sufficient that the value of the reduction ratio G is set such that the minimum value is larger than the yaw resonance frequency $f_{yaw}$ of the vehicle. For example, if the value of the reduction ratio G at which the resonance frequency $f_R$ when the angular acceleration ratio is −1 matches the yaw resonance frequency $f_{yaw}$ of the vehicle is represented by $G_A$, it is sufficient that the value of the reduction ratio G is set to have a value less than $G_A$.

[2. Flow Diagram]

Figure 9:
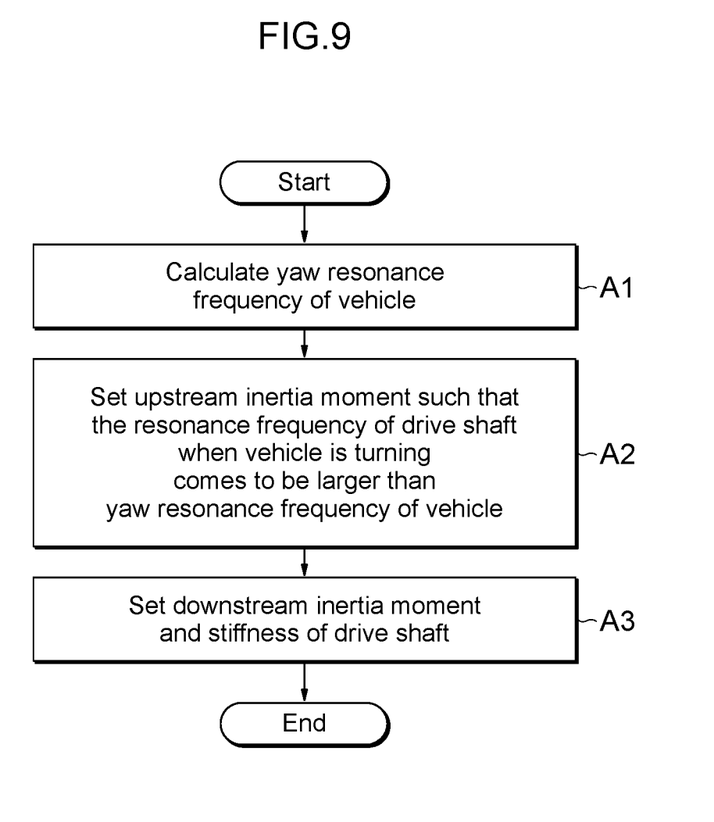
FIG. 9 is a flow diagram showing an example of a procedure of setting a parameter of the driving force adjusting device of FIG. 1.

FIG. 9 is a flow diagram showing an example of a procedure of setting a parameter of the driving force adjusting device. In Step A1, a yaw resonance frequency $f_{yaw}$ is calculated on the basis of a motion equation of the vehicle. In the ensuing Step A2, the upstream inertia moments $J_{ML}$ and $J_{MR}$ are set. Here, the upstream inertia moments $J_{ML}$, $J_{MR}$ are set to be small such that resonance frequency f of the driving force adjusting device while the vehicle turning is larger than the yaw resonance frequency $f_{yaw}$ of the vehicle. In the next Step A3, the downstream inertia moment $J_w$ and the stiffness $K_d$ of the drive shafts 4 are set if needed. This setting can move the resonance frequency f of the driving force adjusting device away from the yaw resonance frequency $f_{yaw}$ of the vehicle, and consequently efficiently suppresses amplification of vehicle body vibration due to the resonance. Therefore, the riding comfortability of the vehicle is improved.

Figure 10:
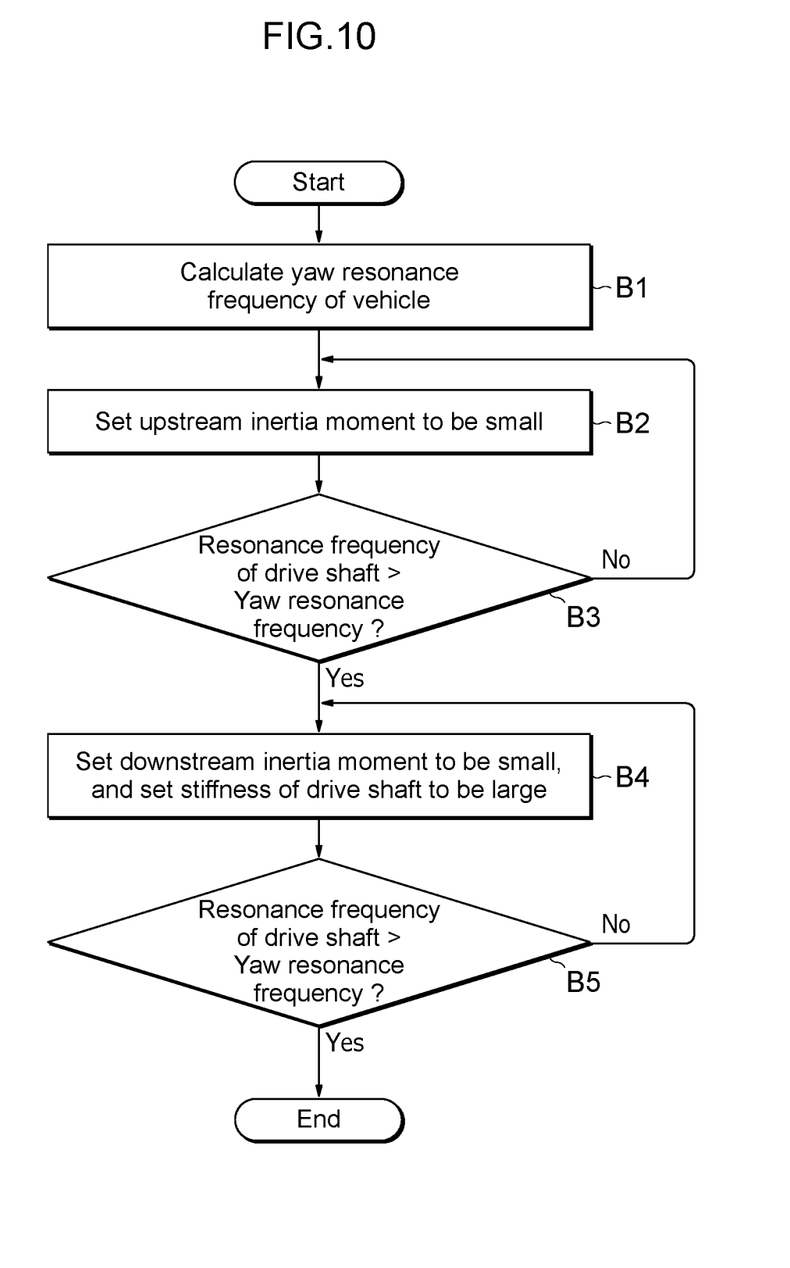
FIG. 10 is a flow diagram showing an example of a procedure of setting a parameter of the driving force adjusting device of FIG. 1.

FIG. 10 is a flow diagram illustrating a procedure of optimizing the upstream inertia moments $J_{ML}$ and $J_{MR}$, the downstream inertia moment $J_w$, and the stiffness $K_d$ of the drive shafts 4 while these are varying in contrast to the flow diagram FIG. 9. In Step B1, a yaw resonance frequency $f_{yaw}$ is calculated on the basis of a motion equation of the vehicle. In the ensuing Step B2, the upstream inertia moment $J_{ML}$ and $J_{MR}$ are set to values slightly smaller than respective default values (preset values). In addition, in Step B3, the resonance frequency f of the driving force adjusting device is calculated, and is then determined whether to be larger than the yaw resonance frequency $f_{yaw}$. If this condition is not satisfied, the procedure returns to Step B2, and the upstream inertia moments $J_{ML}$ and $J_{MR}$ are set to further smaller values. By repeating this process, the largest upstream inertia moments $J_{ML}$ and $J_{MR}$ that satisfy the condition of Step B3 can be obtained. If the condition of step B3 is satisfied, the process proceeds to step B4.

In Step B4, the downstream inertia moment $J_w$ is set to a value slightly smaller than a default value, and the stiffness $K_d$ of the drive shafts 4 is set to a value slightly larger than a default value. In Step B5, likewise in Step S3, the resonance frequency f of the driving force adjusting device is calculated, and is then determined whether to be larger than the yaw resonance frequency $f_{yaw}$. If this condition is not satisfied, the process returns to Step B4, and the downstream inertia moment $J_w$ is set to a further smaller value, or the stiffness $K_d$ is set to a further larger value. By repeating this process, an optimized downstream inertia moment $J_w$ and the optimized stiffness $K_d$ are obtained.

[3. Action and Effect]

(1) In the above embodiment, the upstream inertia moments $J_{ML}$ and $J_{MR}$ are set such that the resonance frequency f of the driving force adjusting device while the vehicle is turning is larger than the yaw resonance frequency $f_{yaw}$. By adopting this method, the resonance frequency f while the vehicle is turning can be moved away from yaw resonance frequency $f_{yaw}$ of the vehicle, and can consequently suppress the vibration of the vehicle. Accordingly, this can less provide an uncomfortable feeling to passengers and can improve the riding comfortability.

(2) In the above embodiment of the driving force adjusting device, the upstream inertia moments $J_{ML}$ and $J_{MR}$ are defined by Expressions 5 and 6. The upstream inertia moments $J_{ML}$ and $J_{MR}$ are optimized on the assumption that the angular acceleration ratio of each of left and right wheels 5 varies within the range of −1 to 1. In other words, the upstream inertia moments $J_{ML}$ and $J_{MR}$ are set such that, when the angular acceleration varies within the range of −1 to 1, the resonance frequency f of the driving force adjusting device while the vehicle is turning comes to be larger than the yaw resonance frequency $f_{yaw}$. In other words, the upstream inertia moments $J_{ML}$ and $J_{MR}$ are calculated on the basis of the motor inertia moment $I_m$ of the pair of electric motors 1, the gear ratios $b_1$ and $b_2$ of the differential mechanism 3, and the angular acceleration ratio of the left and right wheels 5. By adopting this method, the upstream inertia moments $J_{ML}$ and $J_{MR}$ can be precisely calculated, and the vibration of the vehicle can be suppressed regardless a turning state of the vehicle. Consequently, the riding comfortability can be further improved.

(3) In the above embodiment of the driving force adjusting device, the resonance frequency f is defined by Expressions 3 and 4. The downstream inertia moment $J_w$ and the stiffness of the drive shafts 4 can be optimized. That is, the downstream inertia moment $J_w$ and the stiffness $K_d$ of the drive shafts 4 are set to values such that the resonance frequency $f_L$ on the left wheel side and the resonance frequency $f_R$ on the right wheel side come to be larger than the yaw resonance frequency $f_{yaw}$. In other words, the resonance frequency f of the driving force adjusting device is calculated on the basis of the stiffness $K_d$ of the drive shafts 4, the upstream inertia moments $J_{ML}$ and $J_{MR}$, and the downstream inertia moment $J_w$. By adopting this method, the resonance frequency f of the driving force adjusting device can be precisely calculated, and consequently, the riding comfortability can be further improved.

[4. Modification]

The foregoing embodiment is illustrative only and is not intended to preclude the application of various modifications and techniques not explicitly set forth in the present examples. The configurations of the present embodiment can be variously modified without departing from the scope thereof. In addition, the configurations of the present embodiment can be selected and omitted as needed, or can be combined appropriately.

The above embodiment describes a driving force adjusting device applied to the rear wheels of a vehicle. Alternatively, the same driving force adjusting device can be applied to the front wheels and also to both the front wheels and the rear wheels. In addition, a driving force adjusting device using an electric motor 1 and an internal combustion engine as a driving source can be used. In this alternative, the same effect as that of the above embodiment can be obtained by setting the upstream inertia moments $J_{ML}$ and $J_{MR}$ to values such that the resonance frequency f of the driving force adjusting device at least the vehicle is turning is larger than the yaw resonance frequency $f_{yaw}$.

DESCRIPTION OF REFERENCE SIGN

1 Electric motor
2 Reduction mechanism
3 Differential mechanism
4 Drive shaft (Axle, wheel axle)
5 Left and right wheels
$J_{ML}, J_{MR}$ Upstream inertia moment (moment of inertia)
$J_w$ Downstream inertia moment (moment of inertia of left and right wheels)
$I_m$ Motor inertia moment
$b_1, b_2$ Gear ratio of differential mechanism 3
$\omega_{Lm}, \omega_{Rm}$ Motor angular speed
$K_d$ Stiffness of drive shafts 4
f Resonance frequency of driving force adjusting device
$f_{yaw}$ Yaw resonance frequency of vehicle

The invention claimed is:

1. A driving force adjusting device comprising a pair of electric motors that drives left and right wheels of a vehicle, a differential mechanism that provides the left and right wheels with a torque difference, and left and right drive shafts that transmit driving force from the differential mechanism to the left and right wheels, the driving force adjusting device having four elements and two degree of freedom, wherein
inertia moments on paths from the pair of electric motors to the left and right wheels are set to values such that a resonance frequency of the driving force adjusting device when the vehicle is turning comes to be larger than a yaw resonance frequency of the vehicle.

2. The driving force adjusting device according to claim 1, wherein the inertia moments are calculated based on motor inertia moments of the pair of electric motors, a gear ratio of the differential mechanism, and an angular acceleration ratio of the left and right wheels.

3. The driving force adjusting device according to claim 2, wherein the resonance frequency of the driving force adjusting device is calculated based on a stiffness of the drive shafts, the inertia moments, and inertia moments of the left and right wheels.

4. The driving force adjusting device according to claim 1, wherein the resonance frequency of the driving force adjusting device is calculated based on a stiffness of the drive shafts, the inertia moments, and inertia moments of the left and right wheels.

5. A method for designing a driving force adjusting device comprising a pair of electric motors that drives left and right wheels of a vehicle, a differential mechanism that provides the left and right wheels with a torque difference, and left and right drive shafts that transmits driving force from the differential mechanism and to the left and right wheels, the driving force adjusting device having four elements and two degree of freedom, the method comprising
setting inertia moments on paths from the pair of electric motors to the left and right wheels to values such that a resonance frequency of the driving force adjusting device when the vehicle is turning comes to be larger than a yaw resonance frequency of the vehicle.

* * * * *